Patented Apr. 6, 1937

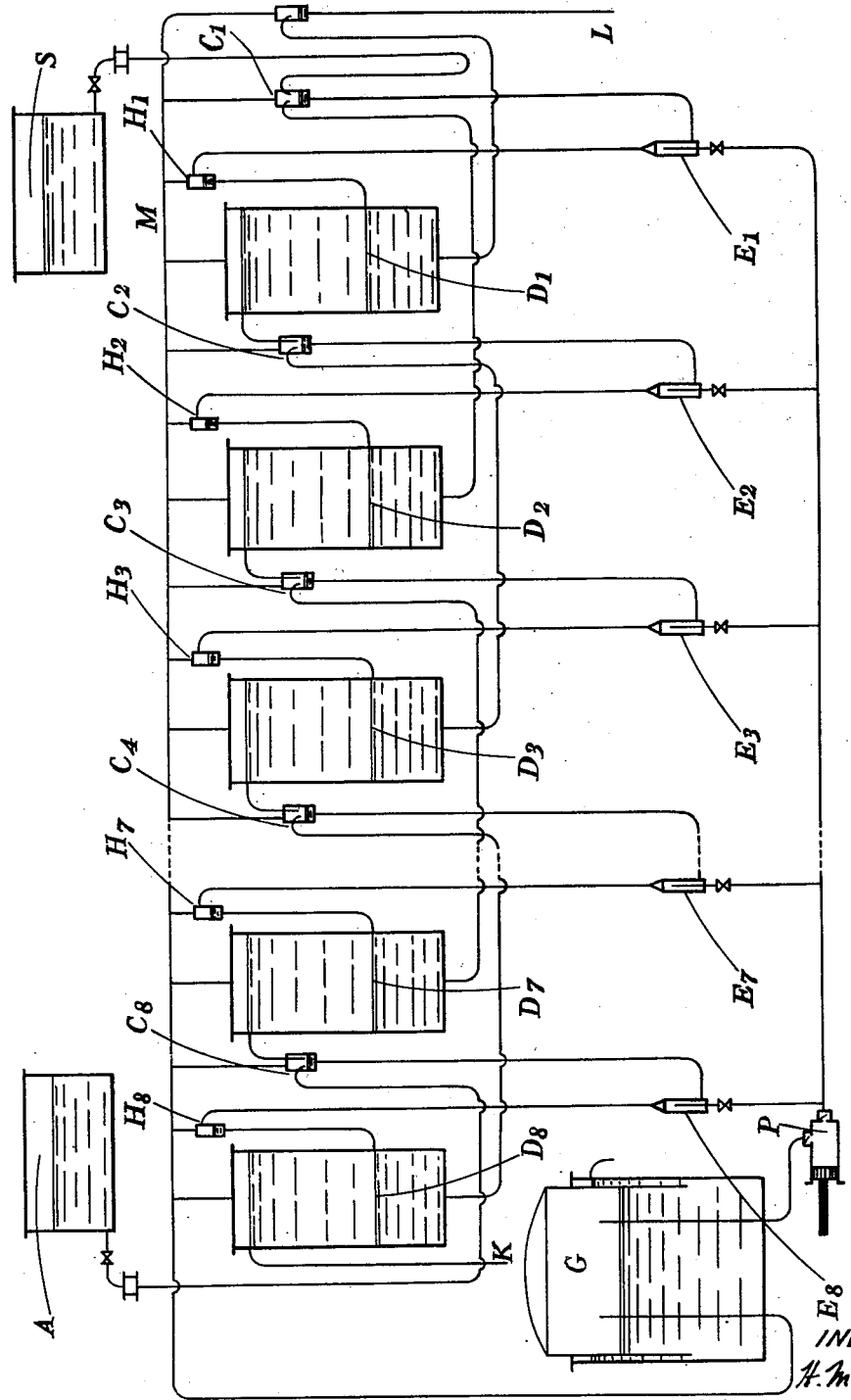

2,076,126

UNITED STATES PATENT OFFICE 2,076,126

PROCESS AND APPARATUS FOR THE EXTRACTION OF PRODUCTS IN SOLUTION BY MEANS OF SOLVENTS

Henri Martin Guinot, Melle, Deux-Sevres, France

Application December 4, 1934, Serial No. 755,996
In France December 7, 1933

10 Claims. (Cl. 260—122)

The present invention relates to an improved process and apparatus for the extraction of products in solution, by means of solvents.

In French Patent No. 671,482 of 14th March 1929, there has been described a process for the extraction of a body by a solvent, using the counter-current principle. The apparatus allowing the process to be carried out was constituted by a certain number of separate elements each comprising a mixer provided with mechanical stirring means and a decanter. The circulation of the liquids was ensured partly by gravity and partly by any mechanical means. In particular, there was described one method of application in which the ascent of one of the liquids was ensured by blowing in an inert gas.

The present invention constitutes an improvement upon the above-mentioned process, and in accordance with the present invention, the process for extracting, with the aid of a solvent, a product from a solution containing it, consists in producing an emulsion of the said solution and the said solvent by injecting an inert gas under pressure into a liquid mixture of said solvent and said solution, simultaneously raising them in a circuit to ensure their subsequent circulation by gravity in said circuit, and immediately decanting the said emulsion produced into layers, whence the product is separated.

This process constitutes an important simplification of known extraction batteries, for it allows the elimination of the mechanical mixer usually used, the working of which is always very sensitive and the cost of which is high.

The following non-limitative example, given with reference to the attached drawing, will easily make understood the nature of the invention.

The problem is to extract the acetic acid contained in a 10% solution by means of ethyl acetate.

The apparatus comprises a series of eight decanters, $D_1$, $D_2$, $D_3$ ... $D_8$, interconnected by suitable piping and to which are attached the traps $C_1$, $C_2$, etc. and the degasification chambers $H_1$, $H_2$, etc. A pump P, drawing off the inert gas within the gasometer G, ensures distribution of the gas in the emulsifiers $E_1$, $E_2$. Lastly, a collector M allows the gas charged with vapours of the solvent (which gas has assisted in the circulation, and which is thus used over and over again indefinitely) to be sent back again to the gasometer G, which reduces to a minimum the losses of solvent.

The acetic acid solution to be treated contained in the vat A arrives at the end of the apparatus whilst the solvent flowing from the vat S is introduced at the other end, in the ratio of 1.5 volumes to 1 volume of acetic solution.

The fresh solvent meets in $C_1$ the already almost spent solution constituting the lower layer from decanter $D_2$. The two liquids flow by gravity into emulsifier $E_1$, whence they are forced up by the gas in the form of an emulsion, to $H_1$, where, after separation of the gas, the mixture flows to $D_1$; the lower layer constituted by the spent aqueous solution flows by L out of the apparatus.

The layer of solvent containing a little acid meets in $C_2$ the lower layer from the decanter $D_3$ and flows with it into the emulsifier $E_2$ whence the two liquids are forced up to $H_2$ to separate in the decanter $D_2$ and thus pass from one element to another.

In $C_8$ the solvent already charged almost to the maximum with acid, meets the fresh acetic solution coming from vat A. After being forced up into $H_8$ and being decanted in $D_8$ the extract is finally withdrawn from the battery by piping K.

In each of the decanters there are observed the following acidity values, expressed in grammes per litre:

| Decanter | 1 | 2 | 3 | 4 | 5 | 6 | 7 | 8 |
|---|---|---|---|---|---|---|---|---|
| Solvent layer | 5.6 | 6.8 | 10.8 | 16.8 | 23.4 | 33 | 46.8 | 64.8 |
| Aqueous layer | 4.2 | 9.0 | 14.4 | 21.0 | 30 | 40.2 | 54.6 | 73.8 |

The yield of the operation would thus be from 96 to 97% but by increasing the number of elements, this yield would be increased in a proportion easy to forecast by calculation. Industrially, an extraction reaching 99.8% is easily reached.

Similarly, the invention may be applied to the extraction, by a solvent, of any organic substances, in aqueous solution or not. For example, it may be applied to glycol chlorhydrin, to fatty or aromatic acids, to phenols, etc. It may also be applied to the extraction of certain impurities contained in hydrocarbons, by utilizing as solvent liquefied gases such as ammonia, sulphurous acid, etc.

What I claim is:—

1. Process for extracting with the aid of a solvent, a product from a solution containing it, consisting in producing an emulsion of the said solution and the said solvent by injecting an inert gas under pressure into a liquid mixture of said solvent and said solution, simultaneously raising them in a circuit to ensure their subsequent circulation by gravity in said circuit, and allowing the emulsion to separate into layers and decanting one layer from the other.

2. Process for extracting with the aid of a solvent, a product from a solution containing it, consisting in producing an emulsion of the said solution and the said solvent by injecting an inert gas under pressure into a liquid mixture of said solvent and said solution, simultaneously raising them in a circuit to ensure their subsequent circulation by gravity in said circuit, and allowing the emulsion to separate into layers and decanting one layer from the other, the injected inert gas serving to effect the raising of the liquids within the said circuit.

3. In a process for extracting a product from a solution thereof with the aid of a solvent therefor, in which process said solution and solvent are moved counter-current to each other through an extracting battery, the steps of producing an emulsion of the said solution and the said solvent by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

4. In a process for extracting glycol chlorhydrin from a solution thereof with the aid of a solvent therefor, in which process said glycol chlorhydrin solution and said solvent are moved counter-current to each other through an extracting battery, the steps of producing an emulsion of the said solution and the said solvent by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

5. In a process for extracting impurities from an impure hydrocarbon fraction with the aid of a solvent for said impurities, in which process said fraction and said solvent are moved counter-current to each other through an extracting battery, the steps of producing an emulsion of the said impure hydrocarbon fraction and the said solvent by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

6. In a process for removing from an impure hydrocarbon fraction impurities which are soluble in liquid ammonia, in which process said hydrocarbon fraction and said liquid ammonia are moved counter-current to each other through an extracting battery, the steps of producing an emulsion of the said hydrocarbon fraction and the liquid ammonia by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

7. In a process for extracting acetic acid from an aqueous solution thereof with the aid of a solvent therefor, in which process said solution and solvent are moved counter-current to each other through an extracting battery, the steps of producing an emulsion of the said solution and the said solvent by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

8. In a process for extracting acetic acid from an aqueous solution thereof with the aid of ethyl acetate, in which process said solution and the ethyl acetate are moved counter-current to each other through an extracting battery, the steps of producing an emulsion of the said solution and the ethyl acetate by injecting an inert gas under pressure for a period of several seconds into a liquid mixture thereof, and then allowing the emulsion to separate into layers and decanting one layer from the other, the injected gas serving simultaneously to raise the liquids within the system to ensure their subsequent circulation.

9. In a battery for the extraction of a product from a solution containing it, with the aid of a solvent, a plurality of decanters, a plurality of traps each connected to one of said decanters, a plurality of emulsifiers each connected to one of said traps, a gasometer, means for interconnecting said decanters through said traps and said emulsifiers, a pump adapted to draw off gas from said gasometer and distribute it to said emulsifiers, and means for recovering said gas and returning it after use to said gasometer.

10. In a battery for the extraction, with the aid of a solvent, of a product from a solution containing it, a gasometer, a plurality of interconnected emulsifiers each connected to said gasometer, means for supplying solution to be treated to said emulsifiers successively, means for withdrawing gas from said gasometer and discharging it into said emulsifiers whereby a fluid emulsion is formed in each of the latter, a degasification chamber connected to each emulsifier thereabove whereby said gas serves also to raise said fluid emulsions to said degasification chambers, a plurality of decanters in which said fluid emulsions are separated into layers, said decanters being severally connected to a degasification chamber, and a trap connected to each decanter, said decanters being interconnected through said traps and emulsifiers.

HENRI MARTIN GUINOT.